United States Patent [19]

Nakazawa et al.

[11] 4,039,986
[45] Aug. 2, 1977

[54] IMAGE PICKUP DEVICE

[75] Inventors: Mitsuru Nakazawa; Toru Takigawa, both of Mobara, Japan

[73] Assignee: Hitachi, Ltd., Japan

[21] Appl. No.: 661,024

[22] Filed: Feb. 24, 1976

[30] Foreign Application Priority Data

Apr. 8, 1975 Japan .............................. 50-47738[U]

[51] Int. Cl.² .............................................. H01F 1/00
[52] U.S. Cl. ...................................... 335/212; 358/248
[58] Field of Search ....................... 335/210, 212, 213; 178/7.81

[56] References Cited

U.S. PATENT DOCUMENTS

| 2,611,003 | 9/1952 | Friend | 335/213 |
| 3,048,654 | 8/1962 | Schade | 178/7.81 |
| 3,566,321 | 2/1971 | Brown | 335/210 |

Primary Examiner—George Harris
Attorney, Agent, or Firm—Craig & Antonelli

[57] ABSTRACT

An image pickup device includes an image pickup tube, a coil assembly disposed around the image pickup tube, and elastic members disposed on the inner circumferential surface of the coil assembly in the proximity of an extremity at the side of a face plate of the image pickup tube and an extremity at the side of the stem thereof for coaxially fixing the image pickup tube and coil assembly, said elastic members comprising a commercially available O ring of elastic material.

3 Claims, 6 Drawing Figures

IMAGE PICKUP DEVICE

FIELD OF THE INVENTION

The present invention relates to an image pickup device provided with an image pickup tube and a coil assembly.

BRIEF DESCRIPTION OF THE DRAWINGS

FIG. 2b is a sectional view taken along a line IIb—IIb in FIG. 2a.

DESCRIPTION OF THE PRIOR ART

Generally, the operation of image pickup tubes requires the focusing or deflection of electron beams. In this respect, the image pickup tube is provided with a coil assembly including a focusing coil and a deflection coil. It is, on the other hand, known that the geometrical distortion of an image on the image pickup tube is proportional in amount to the square and cube of its distance from the central axis of the deflection coil. In other words, the amount $\delta$ of geometrical distortion at a point of the image, spaced apart by $\gamma$ from the central axis of the coil assembly, is expressed as follows;

$$\delta = \alpha\gamma^2 + \beta\gamma^3 \qquad (1)$$

where $\alpha$ and $\beta$ are proportional constants.

Let $\Delta\delta$ be an amount of variation in geometrical distortion at a point further spaced by $\Delta\gamma$ apart from the central axis of the coil assembly, and $$\Delta\delta = (2\alpha\gamma + 3\beta\gamma^2)\Delta\gamma \qquad (2)$$

where $\Delta\gamma$ corresponds to the sum of a deflection of the coil assembly from the axis of the image pickup tube and a deflection of the optical image from the axis of the image pickup tube, and $\Delta\delta$ corresponds to the mutual difference in the misregistration, i.e. geometrical distortion in a multi-tubed color television camera.

This misregistration has an influence upon an image in the quality produced on the color television camera and must be, therefore, reduced as much as possible. It is understood from the expression (2) that $\Delta\gamma$ should be suppressed to under 100$\mu$ in tolerance. That is, the axis of the coil assembly must be aligned with the axis of the image pickup tube and optical axis with precision of not more than 100$\mu$. In this case, the optical axis of the camera and the axis of the coil assembly are previously aligned with each other in the assembly processes, but the image pickup tube can be fixed only with great difficulty in axial alignment with the coil assembly so as to satisfy the above-mentioned value due to the fact that the outer tube of the image pickup tube is difficult to be manufactured with high precision and liable to damage because it is made of glass.

Figure 1:
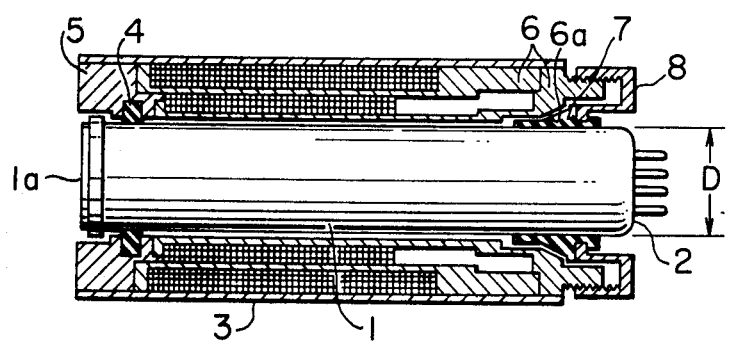
FIG. 1 is a sectional view showing one example of conventional image pickup devices.
Figure 2A:
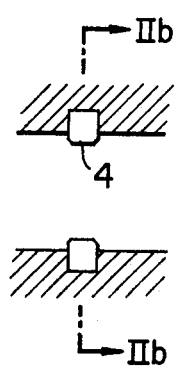
FIG. 2a is a sectional view, corresponding to a part of FIG. 1 for showing an example of a clamp used in the conventional image pickup devices.
Figure 2B:
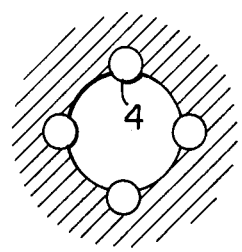
Figure 3:
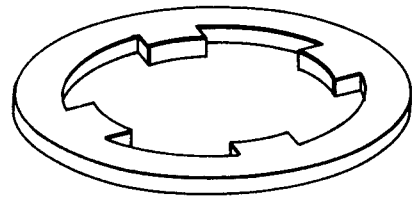
FIG. 3 is a perspective view showing another example of a clamp used in conventional image pickup devices.

FIG. 1 is a section showing a structure for fixing a conventional image pickup device. In the drawing there are shown an image pickup tube 1, a stem 2 of the image pickup tube and a coil assembly 3. This coil assembly 3 comprises focusing and deflection coils, a bobbin for mounting these coils, a clamp 4 made of an elastic material such as gum, a holder 5 for positioning and fixing the clamp 4, a tapered ring 7 made of an elastic material, a clamping screw 8 for providing an axial movement to the tapered ring 7, and other necessary members (not shown). The clamp 4, as shown in FIG. 2, may be embedded in the holder 5 at a plurality of positions in equally spaced relationship around the image pickup tube 1, or constructed in the form of a ring having projections at equally spaced inner positions, as shown in FIG. 3. These clamps 4 have their minimum inner diameter d made smaller than the outer diameter of the image pickup tube 1, and have elasticity sufficient to absorb the irregularity of the outer diameter of the image pickup tube to the extent that it is fixed. The bobbin 6 has a tapered portion 6a at the inside thereof and the tapered ring 7 has a taper facing the tapered portion 6a.

The coil assembly 3 and the image pickup tube 1 are so fixed that the latter is inserted into the coil assembly 3 with the stem 2 ahead and with the inner diameter of the clamp 4 expanded, and the clamping screw 8 is turned when the image pickup tube reaches a predetermined position and the tapered ring 7 is then pushed in between the bobbin 6 and image pickup tube 1.

The image pickup tube generally has an irregular outer diameter, and in the above structure, the image pickup tube with a large outer diameter can be assuredly fixed, but requires a great force because a frictional resistance occurs when the image pickup tube is inserted into the coil assembly, with the resulting danger of damaging the image pickup tube. For the image pickup tube with a small outer diameter, on the other hand, it receives a small frictional resistance when inserted, but brings no assured fixing.

Various shapes of the clamp 4 and tapered ring 7 are proposed, but each requires a special shape. Therefore, they are not only expensive but also difficult to be manufactured with high dimensional precision. This results in difficulty of alignment of the central axis of the coil assembly with that of the image pickup tube with precision of not more than 100$\mu$. Further, a deviation of over 40$\mu$ from the original alignment of the central axes is known to occur when the image pickup tube and coil assembly are removed and again fixed due to the fact that the portion of the clamp 4 which abuts against the image pickup tube 1 is liable to wear and that restoring forces produced from the deformations of the projections due to pressure can be equalized only with difficulty. The image pickup device according to the prior art, therefore, has the drawback that a deviation of over 130$\mu$ appears in the worst case between the central axis of the coil assembly and that of the image pickup tube when the latter is desired to be fixed again because the device has the originally poor precision in alignment of the central axes together with the above deviation from the original alignment of the central axes appearing at the time of renewed fixing.

Figure 4:
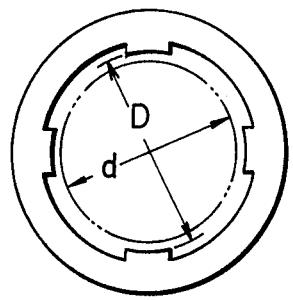
FIG. 4 is a sectional view showing still another example of a clamp used in the conventional image pickup devices.

The clamps shown in FIGS. 2 and 3 are so constructed that they have a minimum inner diameter d slightly smaller than the outer diameter D of the image pickup tube 1. Alternatively, there has been proposed a clamp structure as shown in FIG. 4, in which the clamp has its minimum inner diameter made greater than the outer diameter of the image pickup tube to reduce the pressure of insertion appearing at the insertion of the image pickup tube into the coil assembly in order to fix the image pickup tube and the coil assembly, the clamp being deformed by suitable means after insertion. In such a structure, however, it is necessary to provide a large difference in the dimensions beween the clamp and the image pickp tube from the viewpoint of reducing the insertion pressure because the image pickup tube has a large irregularity in outer diameter due to the fact that it is generally made of glass. The fact that the distance between the element is great means that the clamp should be deformed by a like amount, and thus require the use of a clamp of high elasticity. This produces the difficulty of maintaining the uniformity of deformation and the problem of assuring axial alignment, and requires a small tolerance in the outer dimensions of the pickup tube. As a result, such a structure disadvantageously has problems from the viewpoint of manufacturing or obtaining image pickup tube.

SUMMARY OF THE INVENTION

It is, therefore, an object of the present invention to provide an image pickup device capable of effecting the coaxial fixing of a coil assembly and image pickup tube with high precision and low cost.

In order to achieve the above-mentioned object, the image pickup device according to the present invention utilizes an O ring generally adapted for use in air or oil sealing made of an elastic material, such as the above-mentioned clamp 4 and tapered ring 7 used in fixing the coil assembly and image pickup tube.

DESCRIPTION OF THE PREFERRED EMBODIMENT

Figure 5:
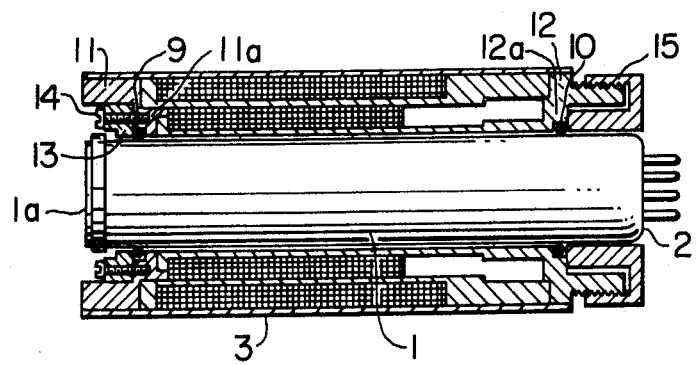
FIG. 5 is a sectional view showing an image pickup device according to an embodiment of the invention.

FIG. 5 is a sectional view showing an image pickup device according to an embodiment of the present invention in which the same portions as those in FIG. 2 are designated with the same numerals. In the figure there are shown O rings 9 and 10, a holder 11 for the O ring 9, a bobbin 12 for mounting focusing and deflection coils thereon, a pressing ring 13 for the O ring 9, and a screw 14 for fixing the pressing ring 13 to the holder 11. These members constitute a clamping mechanism for pressing and clamping the O ring 9. A clamping screw 15 provides an axial pressure to the O ring 10 and serves as a clamping mechanism for the O ring 10. The holder 11 is provided at its inside with a shoulder or stepped portion 11a for receiving the O ring 9 and the bobbin 12 is provided at its inside with a shoulder or stepped portion 12a for receiving the O ring 10. These stepped portions 11a and 12a have their inner diameter made substantially equal to the outer diameters of the O rings 9 and 10 and have their inner walls brought into fitted contact with the outer diameters of the O rings 9 and 10 when the image pickup tube 1 is inserted into the O rings 9 and 10. Further, the stepped portions 11a and 12a are constructed to have an axial depth smaller than the thickness of the O rings 9 and 10 to make the inner diameter of the O rings smaller than the outer diameter of the image pickup tube 1 when the pressing ring 13 is clamped by the screw 14 until it contacts the holder 11 and the clamping screw 15 is turned until it comes into contact with the bobbin 12.

A process for fixing the coil assembly and image pickup tube will next be described.

The image pickup tube 1 is first positioned at a predetermined position of the coil assembly 3 with the screw 14 at the coil assembly and the clamping screw 15 loosened. The clamping screw 15 and the screw 14 are then turned until the pressing ring 13 abuts against the holder 11. The thus produced clamping force causes the O rings 9 and 10 to be so deformed that they have a smaller inner diameter in concentric relationship to the outer diameter to fixedly mount the image pickup tube 1. The image pickup tube 1 may be inserted with the screw 14 loose if the operation of the screw 14 is complicated although the O ring 9 is often worn to some degree in comparison with that in the above-mentioned process.

In the image pickup tube according to the present invention, the coaxial alignment of the coil assembly and the image pickup tube can be achieved with precision within $40\mu$ because the O ring is manufactured with high precisional dimension and is further deformed equally on its circumference with its inner diameter made smaller in concentric relationship to the outer diameter when the O ring is axially compressed. Furthermore, the wear or deformation of the O ring hardly appears when it is inserted. Further, the O ring is not complicated but simple in shape without any projection on its circumference such as the conventional clamp as shown in FIGS. 2 to 4 in which the portions coming into contact with the image pickup tube 1 are provided with projections. As a result, the irregularity of precision in axial alignment ranges within $20\mu$ because of the uniformity of the O ring on its circumference when the image pickup tube is fixed again although the O ring receives wear or deformation. These facts provide a remarkable improvement in precision over the conventional devices. Further, it is possible to reduce the inclination of the image pickup tube relative to the coils in such an image pickup tube as in the present embodiment in which the O ring clamp is used at front and rear sides, that is, at the extremity at the side of a face plate 1a and at the extremity at the stem 2.

The inclination of the tube is less than $(80/Z) \times 10^{-3}$ radian, assuming that the distance between the O ring clamps at the front and rear sides of the image pickup tube is Z mm. It is known that no problem occurs if the inclination of the tube relative to the coil is less than 0.002 radian although it has an influence upon the geometrical distortion. It is, therefore, concluded that Z should be over 40 mm.

The following facts must be, on the other hand, taken into account with reference to the position of the O ring clamp.

The O ring clamp should be disposed at a position more than 3 mm spaced apart inwardly from the front of the tube because the end portion of the glass is liable to damage and further at a position at least more than 5 mm spaced apart inwardly from the rear of the tube because of a very low precision in outer diameter of the glassy outer tube in the proximity of a stem sealing portion at the rear end of the tube. The device according to the present invention assures the coaxial alignment of the tube even if its outer diameter has a similar irregularity to the conventional ones, and has the advantage of ease of manufacture or obtaining an image pickup tube with ease. Further, the O ring is commercially available and easy to obtain, and can be replaced by another when it becomes unservicable due to wear.

Furthermore, the device according to the present invention has the advantage of reducing manufacturing costs because of the simple configuration of the associated elements such as the clamping screw. It is to be noted that the O ring may be circular, triangular or rectangular in section if the dimension between the image pickup tube and the clamp is taken into account. The result of experiments, however, shows that the O ring is preferably circular in section from the point of view of reproducing the coaxial alignment.

We claim:

1. An image pickup device comprising an image pickup tube, a coil assembly disposed around said image pickup tube, elastic members disposed on the inner circumferential surface of said coil assembly in the proximity of an extremity at the side of a face plate of said image pickup tube and an extremity at the side of a stem thereof for coaxially fixing said image pickup tube and coil assembly, and means provided at least at one of said elastic members to move in the axial direction of said device for compressing and deforming said elastic members, wherein said elastic members comprise an O ring of elasticity.

2. An image pickup device according to claim 1, wherein said O ring is circular in section.

3. An image pickup device according to claim 2, wherein said O rings are, respectively, provided in the neighborhood of said compressing means on the inner circumferential surface of said coil assembly, and inserted into a portion of large diameter having an inner diameter greater than the inner diameter of the coil assembly and including a first surface perpendicular to said axial direction and a second surface parallel thereto, said inner diameter being substantially equal to the outer diameter of said O ring, said first surface having a length in the direction perpendicular to said axial direction substantially equal to the sectional diameter of said O ring, said second surface being smaller in the direction parallel to said axial direction than said sectional diameter, and said O rings being compressed by said compressing means and said first surface.

* * * * *